United States Patent [15] 3,642,572
Endres et al. [45] Feb. 15, 1972

[54] CROSS-LINKED POLYAMIDE-IMINE POLYMER FOR PAPERMAKING

[72] Inventors: Horst Endres; Rolf Fikentscher; Walter Maurer; Emil Scharf; Uwe Soenksen, all of Ludwigshafen, Germany

[73] Assignee: Badische Anilin- & Soda-Fabrik Aktiengesellschaft, Ludwigshafen Rhineland, Rhineland-Pfalz, Germany

[22] Filed: Mar. 6, 1969

[21] Appl. No.: 864,216

[30] Foreign Application Priority Data

Oct. 11, 1968 Germany ..................P 18 02 435.6

[52] U.S. Cl. ..........................162/164, 260/2 EN, 260/78 SC
[51] Int. Cl. ........................................................D21h 3/36
[58] Field of Search ..........162/164; 260/78 SC, 2 EN, 561 A

[56] References Cited

UNITED STATES PATENTS 3,224,986 12/1965 Butler ................................260/78 SC
3,250,664 5/1966 Conte ....................................162/164
3,294,723 12/1966 Goldstein ..........................260/2 EN
3,520,774 7/1970 Roth....................................162/164

*Primary Examiner*—S. Leon Bashore
*Assistant Examiner*—Richard H. Anderson
*Attorney*—Johnston, Root, O'Keeffe, Keil, Thompson and Shurtleff

[57] ABSTRACT

Cross-linked reaction products obtained by (a) reacting 1 mole of a dicarboxylic acid such as adipic acid with 0.8 to 1.5 moles of a polyalkylene-polyamine such as diethylenetriamine and/or up to 0.4 mole of an $\omega$-aminocarboxylic acid such as W-amino-caproic acid or a lactam thereof, (b) reacting the reaction product of step (a) with 1 to 30 moles of a 1,2-alkylenimine compound such as ethyleneimine per mole of basic nitrogen in the reaction product of step (a) in the presence of a small amount of acid or alkylating agent such as sulfuric acid as catalyst and (c) cross-linking the reaction product of step (b) with 1 to 20 parts of a bifunctional compound such as epichlorohydrin per 100 parts of reaction product. Twenty-five percent solutions of the new products have a viscosity of from 300 to 4,000 centipoises at 25°.

15 Claims, No Drawings

CROSS-LINKED POLYAMIDE-IMINE POLYMER FOR PAPERMAKING

The invention relates to the production of new reaction products of polyamidoamines with 1,2-alkylenimines and bifunctional cross-linkers which are valuable auxiliaries for the manufacture of paper.

It is known that polyethylenimine may be used in papermaking as a retention agent for fillers and fibers, as an agent for accelerating dewatering in the formation of the sheets and as a flocculant in the recovery of fibrous material. Furthermore it is known from U.S. Pat. No. 2,849,411 and from British Pat. No. 1,156,516 that an auxiliary for papermaking is obtained by reaction of diamines and polyamines with epichlorohydrin. It is moreover known that paper auxiliaries can be made by cross-linking polyamidoamines for example with epichlorohydrin. These groups of products have the disadvantage that each exhibits an optimum effect in the manufacture of paper within a limited pH range.

Cross-linked polyamines have their optimum effect in the neutral pH range, cross-linked polyamidoamines in the acid pH range. However, in papermaking more or less rapid changes of manufacturing conditions from acid to neutral usually occur as a result of changes in the nature of the raw material.

The obvious course is to use a mixture of the two products. It has been found however that the effect in the acid and neutral ranges corresponds only proportionately to the components in the mixture.

We have now found that, surprisingly, effective auxiliaries for the paper industry based on basic polyamidoamines which are particularly suitable as flocculants, retention agents and dewatering agents in neutral and acid media are obtained by grafting onto the basic polyamidoamine from 1 to 30 moles per mole of basic nitrogen in the polyamidoamine of a 1,2-alkylenimine compound having the general formula:

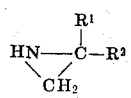

in which $R^1$ and/or $R^2$ denotes a hydrogen atom or a lower alkyl radical having one to three carbon atoms at a temperature of from 25° to 110° C. in the presence of 0.005 to 1.0 equivalent of acid or alkylating agent per mole of basic nitrogen in the polyamidoamine and cross-linking the resultant resin in aqueous solution with from 1 to 20 parts of a bifunctional compound for each 100 parts of 100 percent resin to form a high-molecular weight resin until a 25 percent by weight aqueous solution of the resin has a viscosity of more than 300 centipoises at 25° C.

The basic polyamidoamines used as starting material for the grafting are known compounds which can be obtained by condensation of dicarboxylic acids such as succinic acid, maleic acid, adipic acid and/or terephthalic acid with polyalkylenepolyamines such as diethylenetriamine, triethylenetetramine, dipropylenetriamine or tripropylenetetramine. The ratio of dicarboxylic acid to polyalkylenepolyamine is from 1 : 0.8 to 1 : 1.5 moles, preferably from 1 : 0.9 to 1 : 1.2 moles. Condensation is carried out by a conventional method at elevated temperature, the water formed in the reaction advantageously being distilled off.

The water-soluble basic polyamidoamines obtained have viscosities in 50 percent by weight aqueous solution of more than 100, preferably from 150 to 2,000, centipoises (at 25° C.) and a content of basic nitrogen of from 2.8 to 14 percent, preferably from 4.2 to 8.4 percent, by weight with reference to the 100 percent resin. Viscosity is determined in the Hoeppler viscometer by the falling-ball method.

Diamines such as ethylenediamine, propylenediamine or hexamethylenediamine and/or aminocarboxylic acids or their lactams such as caprolactam may additionally be condensed with these polyamidoamines.

The polyamidoamines serving as starting materials thus contain the following structural units:

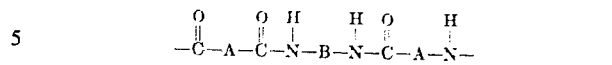

A denoting a saturated or unsaturated aliphatic or aromatic (phenylene) bifunctional hydrocarbon and B denoting — $[(CH_2)_x—NH]_m—(CH_2)_x—$ in which $m$ = zero to 3 and $x$ is not less than 2.

In the condensation of dicarboxylic acids with polyalkylenepolyamines, branched or cross-linked compounds are also formed:

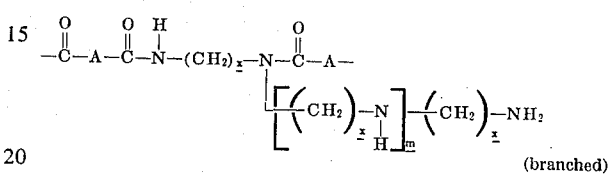
(branched)

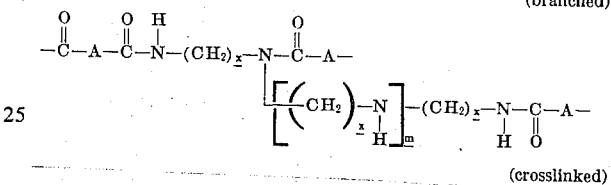
(crosslinked)

1,2-polyalkylenepolyamine side chains can be grafted onto these basic polyamidoamines by reaction with 1,2-alkylenimines. 1,2-alkylenimines such as 1,2-propylenimines and above all ethylenimine are suitable for this purpose. For grafting, 1 to 20 moles, preferably 2 to 15 moles, of 1,2-alkylenimine (per mole of basic nitrogen in the polyamidoamine) is slowly added to a solution of the polyamidoamine in the presence of 0.005 to 1.0 equivalent (per mole of basic nitrogen in the polyamidoamine) of an acid catalyst at a temperature of from 25° to 110°, preferably from 40° to 100° C. It is advantageous to carry out the reaction in 30 to 90 percent by weight aqueous solution, preferably in 40 to 90 percent by weight aqueous solution, with reference to the polyamidoamine. Grafting may also be carried out in an organic medium. Catalysts known from the polymerization of ethylenimine, such as acids or alkylating agents, may be used as catalysts for grafting. The acids include those proton acids which are able to act as proton donors under the reaction conditions and compounds which have an electron gap at the central atom and consequently can add on to the free electron pair of the basic nitrogen atom in the ethylenimine. The latter compounds are known as Lewis acids. Suitable acids for grafting include sulfuric acid, phosphoric acid, perchloric acid, hydrochloric acid, boronfluoride hydrate, chloroacetic acid, organic sulfonic acids, zinc chloride, aluminum chloride, dimethyl sulfate, 1,2-dichloroethane and/or toluenesulfonic esters. Sulfuric acid and above all p-toluenesulfonic acid have proved to be particularly suitable for grafting.

Owing to the high proportion of basic NH and $NH_2$ groups available in the polyamidoamines, the 1,2-alkylenimine mainly reacts with the polyamidoamine with the formation of aminoethyl or polyaminoethyl side chains. Even when small amounts of low-molecular weight polyalkylenimines are formed, these react in the course of the reaction with the basic polyamidoamine (because an excess of polyamidoamine and grafted product is always present):

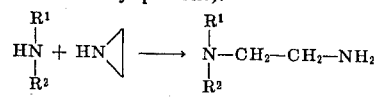

($R^1$ denoting the radical of the polyamidoamine or of the grated-on polyalkylenimine; $R^2$ denoting a hydrogen atom or having the same meaning as $R^1$)

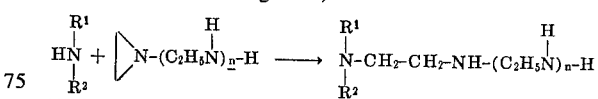

The grafted products are sometimes referred to as grafted resins or 1,2-alkylenimine-polyamidoamine reaction products.

The resin is cross-linked into water-soluble viscous resin of higher molecular weight in aqueous solution by means of bifunctional compounds known as cross-linkers. It is advantageous to carry out the cross-linking in 10 to 40 percent, preferably 15 to 30 percent, by weight aqueous solution with reference to the grafted polyamidoamine at temperatures of from 40° to 100° C. Suitable cross-linkers are bifunctional compounds which react with amines in an aqueous medium. Examples of suitable compounds are dichlorobutene, dichlorobutane or diisocyanate derivatives. Epichlorohydrin, acrylic esters and polyepoxides have proved to be particularly suitable crosslinkers. Examples of suitable polyepoxides are reaction products of pentaerythritol and/or glycerol with epichlorohydrin. A cross-linker containing 0.5 to 0.8 equivalent of epoxy groups per 100 g. of cross-linker and 5 to 10 percent of organically combined chlorine is particularly effective. Since the polyepoxides have little or no solubility in water, they are advantageously used in the form of solutions in water-soluble alcohols, e.g., methanol, ethanol and propanol.

Products which are useful in papermaking are obtained by cross-linking the grafted products into high-molecular weight resins to such an extent that their 25 percent by weight aqueous solution has a viscosity of more than 300, preferably more than 500, centipoises at 25° C. The viscosity is determined by the falling-ball method in a Hoeppler viscometer. The effectiveness of the products increases as the degree of cross-linking increased, i.e., as the viscosity increases. Products having very high viscosity, however, have a strong tendency to gel. In production and processing difficulties arise because of the viscosity rising rapidly with increasing cross-linking, so that there is an upper limit to cross-linking. Products may be processed well up to about 4,000 centipoises in 20 to 25 percent by weight solution at 25° C., equivalent to a specific viscosity of 0.8 to 2 (measured as a 1 percent by weight resin solution in 2 percent by weight aqueous common salt solution at 25° C.).

The amount of bifunctional compound required for cross-linking naturally depends on the constitution of the 1,2-alkylenimine-polyamidoamine reaction product. On the other hand, even with the same starting resin, for example in cross-linking with epichlorohydrin, the higher the reaction temperature and the higher the water content of the resin solution, the more epichlorohydrin is required for the production of a solution having a given viscosity (because of hydrolysis of the cross-linker which always occurs at the same time). Generally from 1 to 20 parts, preferably from 2 to 10 parts, of bifunctional cross-linker is required for each 100 parts of 100 percent by weight resin. Products which have been prepared by cross-linking with 2 to 6 parts of cross-linker, such as epichlorohydrin and polyepoxides, are particularly effective.

Cross-linking may be carried out by adding the amount of cross-linker required for the degree of cross-linking desired either all at once or in portions. The course of the cross-linking is watched by observing the increase in the viscosity of the solution. Adding the cross-linker in portions is preferred because the cross-linking reaction can be controlled better and the risk of the reaction mixture gelling is much less. Furthermore overdosage can be avoided in this way and a specific viscosity can easily be set up.

Cross-linking may also be carried out by adding the cross-linker to the solution of the grafted product at room temperature, heating the reaction mixture to the desired temperature and completing the cross-linking at this temperature until the viscosity of the solution no longer increases.

The cross-linked 1,2-alkylenimine-polyamidoamine reaction products are strongly basic because of the amino groups which they contain. The effectiveness of the cross-linked reaction products as dewatering, flocculating and retention agents is however not affected by neutralization of the resin solutions with acids.

The agents according to the invention in the overwhelming majority of cases constitute an advance in the art since they are universally applicable. Furthermore, as compared with products based on cross-linked polyamidoamines and cross-linked 1,2-polyalkylenamines, they have a clearly better effect as regards retention of filler and dye, acceleration of dewatering and flocculation or flotation in the recovery of material during paper manufacture. It is possible to use these products in every pH range occurring in papermaking. The products of the invention may be used in the production of papers of all types, sized and unsized glazed boards, and in the presence or absence of aluminum sulfate.

The invention is illustrated by the following Examples, in which parts and percentages are by weight.

EXAMPLE 1 a. 1,000 parts of diethylenetriamine in a heatable vessel provided with a stirrer, thermometer and descending condenser has 500 parts of water and 1,450 parts of adipic acid added to it. As soon as the adipic acid has dissolved, the whole is heated under nitrogen to a bottoms temperature of 190° C. within 3 hours and the water is thus distilled off. After condensing for 4 hours at 190° C., the melt is cooled at a subatmospheric pressure of 10 mm. Hg. to 150° to 140° C. and 2,000 parts of water is added to the highly viscous polyamidoamine at 130° C. The aqueous solution obtained is characterized by the following data:

Solids content: 50.9 percent (determined by drying 0.5 g. of resin for 2 hours at 120° C. in a drying cabinet)

Viscosity: 1,361 centipoises at 25° C. (determined by the falling-ball method in a Hoeppler viscometer)

Acid number: 3.74 (with reference to 100 percent product)

Basic nitrogen: 6.2 percent (with reference to 100 percent product)

Specific viscosity: 0.16 (measured as a 1 percent resin solution in 2 percent aqueous common salt solution at 25° C.)

b. 10 parts of p-toluenesulfonic acid is added to 491 parts of the resin solution (1a) and the whole is heated to 65° C. 244 parts of ethylenimine is dripped in within 3 hours. The temperature of the reaction solution rises during the addition of ethylenimine. The temperature is kept at from 80° to 90° C. during grafting. When all the ethylenimine has been added, the whole is kept at 80° C. for another 2 hours and then the solution is diluted with 980 parts of water.

c. Epichlorohydrin is slowly metered within 6 hours at 60° C. into the solution (1b) and the increase in viscosity is observed. After 12.4 parts of epichlorohydrin has been added (9.4 parts within the first 2 hours and 3 parts within the remaining time) the resin begins to gel. The highly viscous solution is diluted with 550 parts of water and the solution is kept at 60° C. for another hour. The solution of the end product as a density of 1.020 g./cm.$^3$, a viscosity (determined as above) of 160 centipoises in 15 percent solution at 25° C. and a specific viscosity (determined as above) of 0.95.

The following Tables give a comparison of the paper-technological properties of the end product with those of a cross-linked polyethylenimine (PEI) which has been prepared according to British Pat. No. 1,156,516.

Measuring methods:

Acceleration of Dewatering

This is characterized by the increase in freeness in °SR (degrees Schopper-Riegler) according to the method of Instruction Sheet 107 of the Verein der Zellstoff- und Papierchemiker und Ingenieure (Association of cellulose and paper chemists and engineers).

Filler Retention

This is characterized by the ash content of sheets of paper, prepared on the Rapid-Kothen apparatus according to Instruction Sheet 108 of the Verein der Zellstoff- und Papierchemiker und Ingenieure.

| Pulp composition of the test paper material: | 80% of bleached sulfite cellulose 35° SR |
|---|---|
| | 20% of china clay. |
| Density of pulp: | 0.24 g./liter. |

TABLE 1a

ACCELERATION OF DEWATERING (measured as increase in freeness in °SR)

Pulp: Newsprint, beaten free from specks in an Ultraturrax apparatus.

| Addition: (100% resin with reference to absolutely dry cellulose) O-value (without added resin): | pH 7.3 | | pH 5 1% of alum | |
|---|---|---|---|---|
| | 0.10 | 0.15% | 0.10 | 0.15% |
| | 59.5 | | 65 | |
| Cross-linked PEI (according to British Pat. No. 1,156,516) | 36 | 34 | 56 | 55 |
| Example 1c: | 34 | 28 | 44 | 43 |

TABLE 1b

FILLER RETENTION: percent of ash in paper; addition 0.015 percent of 100 percent resin with reference to cellulose and filler.

| pH value of fiber suspension | 6 | 4.5 | |
|---|---|---|---|
| addition of alum with reference to cellulose plus filler | 0.5% | 3.5% | |
| O-value | 6.4 | 6.5 | |
| cross-linked PEI (according to British Pat. No. 1,156,516) | 8.1 | 6.5 | % ash in paper |
| Example 1c: | 8.8 | 8.1 | |

EXAMPLE 2 a. 530 parts of water, 667 parts of a mixture of 91.5 percent of diethylenetriamine and 8.5 percent of triethylenetetramine and 925 parts of adipic acid are heated under a nitrogen atmosphere within 3.5 hours to 160° C. and kept at this temperature for 5 hours so that the water distils off. The polyamidoamine formed has 1,400 parts of water added to it at 130° C. (solids content 48.3 percent). The resin solution obtained has a density of 1.095 g./cm.³ and a viscosity (determined as above) of 320 centipoises at 25° C.; the content of basic nitrogen is 7.0 percent with reference to the 100 percent product.

b. 15.5 parts of concentrated sulfuric acid is added to the resin solution which contains 250 parts of 100 percent resin (2a); 534 parts of a 50 percent aqueous solution of ethylenimine is dripped into this solution at 80° to 85° C. within 4 hours. When all the ethylenimine has been added, the temperature is kept at 80° C. for 30 minutes. The resin solution obtained has a solids content of 50.2 percent (determined as above), a density of 1.094 g./cm.³ and a viscosity of 753 centipoises at 25° C. (determined as above).

c. 750 parts of the solution 2b is diluted with an equal amount of water and then 21.4 parts of epichlorohydrin is dripped in at 70° C. within 90 minutes. After the whole has been stirred for another 90 minutes at 70° C. the resin solution has a viscosity of 1,100 centipoises at 25° C. (determined as above) at a solids content of 26 percent. The specific viscosity of the product is 0.91 and the density 1.048 g./cm.³ (both determined as above). In papermaking the following effects can be achieved in the presence of this resin:

ACCELERATION OF DEWATERING: (measured as increase in freeness in °SR)

Pulp: unbleached sulfite cellulose, laboratory grinding in the Rieth beater.

| Addition (cross-linked resin 100% with reference to absolutely dry cellulose) O-valve | pH 7.3 | | pH 4.8 1.5% alum | |
|---|---|---|---|---|
| | 0.10 | 0.15% | 0.10 | 0.15% |
| | 56 | | 63 | |
| cross-linked PEI (according to British Pat. No. 1,156,516) | 42 | 31 | 56 | 53 |
| Example 2c: | 42.5 | 35 | 41 | 35 |

EXAMPLE 3 a. 450 parts of water and 495 parts of diethylentriamine are placed in a receptacle and 675 parts of adipic acid and 113 parts of caprolactam are slowly added at temperatures up to 80° C. Then water is distilled off under nitrogen and the temperature is kept for 2 hours at 120° C., then the bottoms are slowly heated to 150° C., kept for 3 hours at this temperature and then heated to 170° C. and kept at this temperature until the acid number of the resin at this temperature until the acid number of the resin has fallen below 10. When the condensation is over, the whole is cooled to 130° to 140° C. and the condensation product is dissolved in 1,150 parts of water. The polyamidoamine solution has a concentration of 51.0 percent. The content of basic nitrogen is 5.74 percent with reference to 1,004 resin. The 50 percent aqueous resin solution has a viscosity of 1,000 centipoises at 25° C. (determined as above) and a density of 1.096 g./cm.³ at 25° C.

b. $(\alpha,\beta,\gamma)$ 1,000 parts of a solution of the resin 3a adjusted to a solids content of 50 percent has 85 parts of a 50 percent aqueous solution of p-toluenesulfonic acid added to it and the whole is heated to 70° C. At 70° to 80° C., B parts of a 50 percent aqueous ethylenimine solution is dripped in within A minutes; after all the ethylenimine has been added, the solution is kept for another 3 hours at 80° C. and then cooled to room temperature.

c. $(\alpha,\beta,\gamma)$. The solution from (b) is diluted with C parts of water and D parts of epichlorohydrin is added to this solution at room temperature; then the whole is heated to 60° C. within 30 minutes and kept at this temperature until there is no further increase in viscosity detectable (period from 2 to 3 hours). The end product has a specific viscosity of E at 15° C. (determined as above).

| Batch | A | B | C | D | E |
|---|---|---|---|---|---|
| $\alpha$ | 150 | 448 | 1,533 | 28 | 0.70 |
| $\beta$ | 240 | 915 | 1,990 | 34 | 0.74 |
| $\gamma$ | 400 | 1,370 | 2,455 | 39 | 0.76 |

In papermaking the following effects can be achieved in the presence of the said resin:

Acceleration of Dewatering: (measured as increase in freeness in °SR)

Pulp: newsprint

| Addition (cross-linked resin (100%) with reference to absolutely dry cellulose) O-value | pH 7.3 | | pH 5; 1% of alum | |
|---|---|---|---|---|
| | 0.10 | 0.15% | 0.10 | 0.15% |
| | 59 | | 65 | |
| cross-linked PEI (according to British Pat. No. 1,156,516) | 36 | 34 | 56 | 55 |
| $\alpha$ | 38 | 33.5 | 41 | 40 |
| $\beta$ | 36 | 30.5 | 44 | 42 |
| $\gamma$ | 35.5 | 29.5 | 44 | 43 |

Filler Retention:

(percent ash in paper)

Pulp: 80 percent bleached sulfite cellulose 35°SR 20 percent china clay

Addition: 0.015 percent of cross-linked resin (100 percent) with reference to fiber and filler.

| Addition of alum (with reference to fiber and filler) O-value | pH 6 | pH 4.5 |
|---|---|---|
| | 0.5% | 3.5% |
| | 6.4 | 6.5 |
| cross-linked PEI (according to British Pat. No. 1,156,516) | 8.1 | 6.5 |
| $\alpha$ | 9.0 | 8.4 |
| $\beta$ | 8.3 | 8.3 |
| $\gamma$ | 8.7 | 7.6 |

EXAMPLE 4 a. 150 parts of 50 percent aqueous p-toluenesulfonic acid solution is added to 2,000 parts of the resin solution from Example 3a diluted to a solids content of 50 percent and at 70° to 80° C., 3,720 parts of 50 percent aqueous ethylenimine solution is added in the course of 220 minutes. When all the ethylenimine has been added the whole is kept at 80° C. for another 2 hours. The resin solution obtained has a viscosity of 1,300 centipoises at 25° C. and a solids content of 49.5 percent (both determined as above).

c. 2,270 parts of the resin solution (4b) is diluted with an equal amount of water. 43 parts of epichlorohydrin is added at 25° C. and the mixture is heated to 60° C.; 1 hour later the resin solution has a viscosity of 210 centipoises at 25° C. (determined as above); within 5 hours another 4.2 parts of epichlorohydrin is added. The viscosity of the solution thus rises to 750 centipoises at 25° C. The 25 percent solution of the cross-linked product is adjusted to pH 8 with 450 parts of 85 percent formic acid and adjusted to a solution having 20 percent of active substance with 943 parts of water. This solution has a density of 1.060 g./cm.$^3$ and a viscosity of 560 centipoises (determined as above). The following effects can be achieved in the presence of this resin in the manufacture of paper:

Acceleration of Dewatering: (measured as increase in freeness in °SR)

Pulp I: newsprint beaten in an Ultraturrax apparatus;
Pulp II: unbleached sulfite cellulose (Rieth beater):

|  | I | | II | |
|---|---|---|---|---|
|  | Neutral medium | pH 5 | Neutral medium | pH 5 |
| Alum (with reference to bone-dry cellulose), percent | | 1.5, 1.5 | | 1.5, 1.5 |
| Addition percent (with reference to absolutely dry cellulose) | 0.10, 0.15 | 0.10, 0.15 | 0.10, 0.15 | 0.10, 0.15 |
| O-value | 48.4 | 47 | 59 | 58 |
| Crosslinked PEI (according to British Patent No. 1,156,516) | 27, 25 | 34, 33 | 49, 39 | 43, 39 |

Filler Retention: (percent ash in the paper)
Addition: 0.015 percent of active substance with reference to fiber and filler.

|  | pH 6; 0.5% alum | pH 5; 1.5% alum |
|---|---|---|
| O-value | 5.3 | 5.1 |
| cross-linked PEI (according to British Pat. No. 1,156,516) | 5.9 | 5.2 |
| Example 4c: | 6.8 | 7.1 |

Comparative Experiments:

For comparison, polyamidoamines which have been cross-linked with epichlorohydrin but have not been reacted with ethylenimine are tested for their properties in use. They are prepared in the following way:

d. 1,000 parts of a 50 percent aqueous polyamidoamine solution prepared according to Example 3(a) is diluted with 1,000 parts of water and cross-linked at 60° to 70° C. with 30.6 parts of epichlorohydrin within 20 hours; the 25.2 percent solution of the product has a viscosity of 4,500 centipoises at 25° C. (determined as above).

e. Cross-linking is carried out analogously to (d) but with only 29.8 parts of epichlorohydrin. The 25 percent resin solution obtained has a viscosity of 900 centipoises at 25° C. (determined as above).

Acceleration of Dewatering: (measured as increase in freeness in °SR)

Test substance: unbleached sulfite cellulose; grinding in a Rieth beater:

|  | Neutral medium | pH 4.8; 1.5% alum |
|---|---|---|
| Addition (crosslinked resin (100%)) with reference to absolutely dry cellulose), percent | 0.10, 0.15 | 0.10, 0.15 |
| O-value | 54 | 57.5 |
| Crosslinked PEI (according to British Patent No. 1,156,516) | 41, 31.5 | 49, 47 |
| Example 4c | 43, 31 | 37.5, 33 |
| Comparative experiment (d) | 48, 42.5 | 44.5, 36.5 |
| Comparative experiment (e) | 48.5, 46 | 48, 43.5 |
| 1:1 mixture of crosslinked PEI (British Patent No. 1,156,516) and polyamidoamine (comparative experiment (d)) | 46, 39 | 47, 45 |

Flocculation:

Characterized by visual comparison of the flocculation and sedimentation rates. The amount added in parts of cross-linked resin per 10$^6$ parts of fiber suspension having a content of 0.03 percent of absolutely dry fiber in order to produce the same effect serves as the measure.

Flocculation:

Fibrous material: unbleached sulfite cellulose ground in a stoneware beater 82° SR.

| | Flocculation at | |
|---|---|---|
| | pH 7 | pH 4.5; 4% alum |
| | Addition of cross-linked resin in parts per 10$^6$ parts of 0.03% suspension of fibrous material | |
| cross-linked PEI (according to British Pat. No. 1,156,516) | 1.2 | no flocculation at 10 mg. |
| Example 4c | 1 | 1 |
| Comparative experiment (d) | 3 | 1.5 |

EXAMPLE 5 c. 1,000 parts of a grafted resin solution prepared according to Example 3 (b,γ) is mixed at 20° C. with 1,050 parts of water and 52 parts of methyl acrylate. After stirring for 2½ hours at 60° to 65° C., the viscosity of the solution is 700 centipoises at 25° C. (measured as above). The solution has a solids content (measured as above) of 24.8 percent, a density of 1,044 g./cm.$^3$ and a specific viscosity of 0.87. The following effects are achieved in the manufacture of paper with unbleached sulfite cellulose in the presence of this cross-linked resin:

Acceleration of Dewatering: (measured as increase in freeness in °SR)

|  | neutral medium | | pH 4.8; 1.5% alum | |
|---|---|---|---|---|
| Addition (cross-linked resin (100%) with reference to absolutely dry cellulose) | 0.10% | 0.15% | 0.10% | 0.15% |
| O-value: | 59 | | 56 | |
| Example 5c | 40 | 33 | 39 | 37.5 |

A product having the same properties is obtained when methyl acrylate is replaced by the equivalent amount of ethyl acrylate.

EXAMPLE 6 a. 146 parts of adipic acid and 51 parts of hexamethylenediamine adipate (AH-salt) is added under nitrogen to 108 parts of diethylenetriamine and 108 parts of water. The whole is heated within 4 hours (with slow distillation of water) to 150° C. (bottoms temperature) and within another 4 hours to 170° C. The product then has an acid number of 5.0. The melt is cooled and 260 parts of water is added at 130° C.

The 50 percent aqueous resin solution has a viscosity of 600 centipoises (measured as above) and contains 2.7 percent of basic nitrogen with reference to resin solution.

b. 4.5 parts of p-toluenesulfonic acid is added to 100 parts of a 50 percent solution of the polyamidoamine (6a) and at 90° C. 200 parts of 50 percent aqueous ethylenimine solution is dripped in within 4 hours.

c. The solution (6b) obtained is diluted to a solids content of 25 percent. Epichlorohydrin is dripped in slowly at 70° C.

and the rise in viscosity of the resin solution is observed. After 10 parts of epichlorohydrin has been added, a viscosity of 1,210 centipoises at 25° C. is achieved (measured as above). The solution has a solids content of 26 percent and a specific viscosity of 0.87 (both measured as above). The following acceleration of dewatering is exhibited in a pulp of unbleached sulfite cellulose.

Acceleration of Dewatering: (measured as increase in freeness in °SR)

| Addition (cross-linked resin (100%) with reference to absolutely dry cellulose) | neutral medium | | pH 4.8; 1.5% alum | |
|---|---|---|---|---|
| | 0.10% | 0.15% | 0.10% | 0.15% |
| O-value | 56 | | 53 | |
| Example 6c | 45 | 33 | 45 | 36.5 |

EXAMPLE 7 a. A mixture of 250 parts of water, 525 parts of diethylenetriamine, 150 parts of ethylenediamine, 340 parts of caprolactam and 1,090 parts of adipic acid is heated to 170° C. within 5 hours while distilling off water and kept at this temperature until the acid number has fallen below 10; then water is added at 130° C. to dilute the mixture to a 50 percent resin solution. This has a viscosity of 870 centipoises at 25° C. (measured as above) and a content of 1.96 percent of basic nitrogen with reference to 100% resin.

b. 54 parts of p-toluenesulfonic acid is added to 2,000 parts of the 50 percent aqueous resin solution (7a). 2,440 parts of 50 percent ethylenimine is dripped in within 5 hours at 80° to 90° C. and the solution is kept at 80° C. for another 3 hours.

c. Epichlorohydrin is dripped into 1,000 parts of the solution (7b) adjusted to 25 percent of solids content and the rise in viscosity is watched during crosslinking. The viscosity of the solution (measured as above) rises within 3 hours to 850 centipoises during the slow addition of 11.1 parts of epichlorohydrin. The solution obtained is adjusted to a solids content of 25 percent and then has a viscosity of 600 centipoises and a specific viscosity (measured as above) of 0.89. The following dewatering and retention values are obtained in the presence of this product:

Retention (percent of ash in the paper)
Substance: 80 percent of bleached sulfite cellulose 35°SR 20 percent of china clay
Addition: 0.015 percent of cross-linked resin (100 percent) with reference to fiber and filler.

| | pH 6; 0.5% alum | pH 4.8% 1.5% alum |
|---|---|---|
| | % ash in the paper | |
| O-value | 7.11 | 5.3 |
| cross-linked PEI (prepared according to British Pat. No. 1,156,516) | 9.78 | 6.1 |
| Example 7c | 11.3 | 8.4 |

Acceleration of Dewatering: (measured as increase in freeness in °SR)
Substance: unbleached sulfite cellulose (grinding in Rieth beater)

| | pH 4.8; 1.5% alum | |
|---|---|---|
| Addition (cross-linked resin (100%) with reference to absolutely dry cellulose) | 0.10% | 0.15% |
| O-value | 59 | |
| cross-linked PEI (prepared according to British Pat. No. 1,156,516) | 49 | 47 |
| Example 7c | 43 | 38 |

EXAMPLE 8 a. A 50 percent resin solution is prepared according to Example 2(a). It contains 6.7% of basic nitrogen with reference to the 100% product.

b₁. 145 g. of 50 percent sulfuric acid is added to 1,000 parts of the resin solution (a) in the course of 30 minutes. Then 2,000 parts of a 50 percent aqueous ethylenimine solution is added at 80° to 90° C. in the course of 4½ hours and the reaction mixture is kept at 85° C. for another hour. The resultant solution of the grafted product is adjusted to a solids content of 45 percent and then has a density of 1.096 g./cm.$^3$ at 25° C. and a viscosity (measured as above) of 368 centipoises at 25° C.

b₂. 244 g. of 50 percent sulfuric acid is added to 1,000 parts of the resin solution (a) in the course of 30 minutes and the whole is reacted with ethylenimine as described in paragraph (b₁). The resin solution obtained is adjusted to a solids content of 45 percent and then has a density of 1.087 g./cm.$^3$ at 25° C. and a viscosity (measured as above) of 306 centipoises at 25° C.

c₁. 400 parts of the 50 percent solution (b₁) is diluted with 400 parts of water. 11.32 parts of epichlorohydrin is added at 75° to 85° C. in the course of 5 hours and the grafted product is cross-linked. The solution is adjusted to a solids content of 25 percent and then has a viscosity (measured as above) of 1,085 centipoises at 25° C. and a density of 1.051 g./cm.$^3$ at 25° C.

c₂. 12.62 parts of epichlorohydrin is added to 400 parts of the 50 percent solution (b₂) as described in paragraph (c₁). The resin solution obtained is adjusted to a solids content of 25 percent and then has a viscosity (measured as above) of 1,122 centipoises at 25° C. and a density of 1.046 g./cm.$^3$ at 25° C.

The resin solutions (c₁) and (c₂) are adjusted to pH 8.25 with 85 percent formic acid and diluted to a content of active substance of 20 percent. In papermaking, the following effects are obtained in the presence of these resins:

Acceleration of Dewatering: (measured as increase in freeness in °SR)
Pulp: unbleached sulfite cellulose; laboratory grinding in a Rieth beater.

| | pH 7.3 | | pH 4.8; 1.5% alum | |
|---|---|---|---|---|
| Addition (cross-linked resin (100%) with reference to absolutely dry cellulose) | 0.10% | 0.15% | 0.10% | 0.15% |
| O-value | 56 | | 56 | |
| Example 2 (c) | 44 | 31 | 37 | 33 |
| Example 8 (c₁) | 46 | 36 | 38 | 32 |
| Example 8 (c₂) | 45 | 36 | 37 | 32 |

EXAMPLE 9 a. A 50 percent resin solution is prepared according to Example 2(a). It contains 6.7 percent of basic nitrogen with reference to the 100 percent product.

b. 70 parts of 50 percent sulfuric acid is added to the resin solution (a). Then 2,000 parts of a 50 percent aqueous ethylenimine solution is added uniformly in the course of 4 hours at 85° C. The reaction mixture is then stirred for 4 hours at 85° C. The solution obtained is adjusted to a solids content of 45 percent and then has a density of 1.079 g./cm.$^3$ at 25° C. and a viscosity (measured as above) of 388 centipoises at 25° C.

c. 200 parts of the 50 percent solution of the grafted product (b) is diluted with water to a solids content of 25 percent. The dissolved resin is cross-linked in the course of $q$ hours (total reaction time in cross-linking) at 65° to 70° C. by adding $n$ parts of cross-linking agent X in the course of $m$ hours. The resin solutions obtained are adjusted to a solids content of 25 percent and then have a viscosity (measured as above) of Y centipoises at 25° C.

| | n | X | m | q | Y |
|---|---|---|---|---|---|
| (α) | 7.05 | epichlorohydrin | 2.5 | 3.5 | 745 |
| (β) | 9.65 | 1,3-dichloropropanol-2 | 3 | 6 | 840 |
| (γ) | 5.06 | 1,4-dichlorobutene-2 | 2.2 | 4.5 | 975 |
| (δ) | 5.18 | adduct of sodium bisulfite to | | | |

| (e) | 6.6 | hexamethylene diisocyanate reaction product of pentaerythritol, glycerol and epichlorohydrin (as a 50% solution in methanol) Epoxy equivalent: 0.62 equivalents/100 g. Chlorine content: 7% | 5 5+')7+') | 5.5 | 847 1,300 |

*') Addition at 70° C., further reaction at 80° C.

In papermaking, the following effects are obtained in the presence of these cross-linked resins:
Acceleration of Dewatering: (measured as increase in freeness in °SR)
Pulp: unbleached sulfite cellulose

| | neutral medium | | pH 4.8; 1.5% alum | |
|---|---|---|---|---|
| Addition (cross-linked resin (100%) with reference to absolutely dry cellulose) O-value | 0.10% 57 | 0.15% | 0.10% 54 | 0.15% |
| α | 37 | 28 | 39 | 35 |
| β | 37 | 29 | 38 | 33 |
| γ | — | —' | 40 | 38 |
| δ | 37 | 31 | 38 | 32 |

Filler Retention: (percent ash in paper)
Pulp: 80 percent of bleached sulfite cellulose 35°SR 20 percent of china clay
Addition: 0.03 percent of cross-linked resin (100 percent) with reference to fibers and filler.

| | | pH 6 | pH 4.8 |
|---|---|---|---|
| Addition of alum (with reference to fibers and fillers) O-value | | 0.5% | 1.5% |
| Example 9(c) | (α) | 4.5 12.3 | 5 11.2 |
| | (β) | 12.5 | 11.2 |
| | (γ) | 12.6 | 11.4 |

Results exhibiting similar ratios, though with different absolute figures, are obtained when using the following substances, instead of the substances used in the foregoing Examples, for determining the acceleration in dewatering:
a. mechanical pulp (63°SR)
b. bleached sulfite cellulose (60° SR) or
c. a 1 : 1 mixture of mechanical pulp (63°SR) and unbleached sulfite cellulose (35° SR).

What we claim is:
1. A process for the production of auxiliaries for the papermaking industry which comprises
   a. reacting 1 mole of terephthalic acid or a dibasic acid of the formula

$$HOOC-R-COOH,$$

where R denotes an aliphatic alkylene group having from two to six carbon atoms with 0.8 to 1.5 moles of a polyalkylenepolyamine of the formula

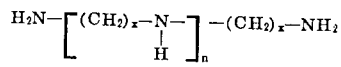

where x denotes an integer from 2 to 6 and n an integer from 1 to 3 and up to 0.4 mole of an ω-amino-carboxylic acid or its lactam of the formula

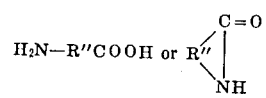

wherein R" denotes an aliphatic alkylene group having from four to six carbon atoms;
   b. reacting the reaction product of step (a) in an aqueous solution or in a solution of a mixture of water and a water-soluble solvent, the solution having a solids content of from 30 to 90 percent by weight of the reaction product of step (a), at a temperature of from 25° to 100° C. with 1 to 30 moles of an alkyleneimine (I) of the formula

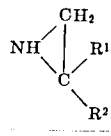

where $R^1$ and $R^2$ denote a member selected from the group consisting of hydrogen and an alkyl group having from one to three carbon atoms, in the presence of from 0.055 to 1 equivalent of an acid or an alkylating agent (II), the molar amount of (I) and (II) being with reference to one mole of basic nitrogen in the reaction product of step (a); and
   c. thereafter reacting the product obtained in step (b) in an aqueous solution or in a solution of water and a water-soluble organic solvent, the solution having a solids content of from 10 to 40 percent by weight, with about 1 to 20 percent by weight, with reference to the product of step (b), of a bifunctional, cross-linking agent at a temperature of from 40° to 100° C. and cross-linking the product of step (b) to such a degree that a solution containing 25 percent by weight of said product has a viscosity of from 300 to 4,000 centipoises (25° C).
2. A process as claimed in claim 1, which comprises
   a. reacting 1 mole of a dibasic acid of the formula $$HOOC-R-COOH,$$

where R is an aliphatic alkylene group having from two to four carbon atoms, with 0.9 to 1.2 moles of a polyalkylenepolyamine selected from the group consisting of diethylenetriamine, triethylenetetramine, dipropylenetriamine, tripropylenetetramine and tetraethylenepentamine, and up to 0.4 mole of ω-aminocaproic acid or caprolactam and
   b) reacting the reaction product of step (a) in an aqueous solution having a solids content of from 30 to 90 percent by weight in the presence of from 0.05 to 1 equivalent of an acid (II) selected from the group consisting of sulfuric acid, o-and p-toluene-sulfonic acid, phosphoric acid, hydrochloric acid with 2 to 20 moles of ethylenimine (I), the molar amounts of (I) and (II) being with reference to 1 mole of basic nitrogen in the reaction product of step (a) at a temperature from 25° to 100° C., and
   c. thereafter reacting the reaction product of step (b) in an aqueous solution having a solids content of from 15 to 30 percent by weight at a temperature of from 40° to 100° C. with 1 to 20 percent by weight, with reference to the solids content, of a bifunctional cross-linking agent selected from the group consisting of epichlorohydrin, methyl acrylate, ethyl acrylate, 1,3-dichloropropanol-2, 1,4-dichlorobutane, the addition product of sodium hydrogen sulfite to hexamethylene diisocyanate and the reaction product of pentaerythritol, glycerol and epichlorohydrin, which reaction product has an epoxy equivalent of from 0.5 to 0.8 per 100 g. of reaction product and a chlorine content of from 5 to 10 percent by weight of chlorine; and cross-linking the reaction product of step (b) to such a degree that a solution containing 25 percent by weight of said cross-linked product has a viscosity of from 500 to 2,000 centipoises (25° C.).
3. A process as claimed in claim 1, wherein the reaction product of step (a) comprises 1 mole of adipic acid and 0.9 to 1.2 moles of diethylenetriamine.
4. A process as claimed in claim 3, wherein the reaction product os step (a) further comprises up to 0.4 mole of caprolactam.
5. A process as claimed in claim 2, wherein the reaction product of step (a) further comprises up to 30 percent by weight of the polyalkylenepolyamine of a diamine selected from the group consisting of ethylenediamine, propylenediamine and hexamethylenediamine.

6. A process as claimed in claim 3, wherein an aqueous solution of the reaction product of step (a) having a solids content of 50 percent by weight is (b) reaction at a temperature from 40° to 100° C. with 2 to 20 moles of ethylenimine (I) in the presence of from 0.05 to 1.0 equivalent of sulfuric acid or toluene-sulfonic acid (II), the molar amount of (I) and (II) being with reference to 1 mole of basic nitrogen in the reaction product of step (a); and c. thereafter the reaction product of step (b) is further reacted in an aqueous solution, having a solids content of from 15 to 30 percent by weight with 2 to 10 percent by weight, with reference to the solids content of the solution, of epichlorohydrin at a temperature of from 40° to 100° C., and the reaction product of step (b) is further cross-linked to such a degree that a solution containing 25 percent by weight of said cross-linked product of step (b) has a viscosity of from 500 to 2,000 centipoises (25° C.).

7. A process as claimed in claim 6 wherein the cross-linking agent is the reaction product of pentaerythritol, glycerol and epichlorohydrin, which agent has an epoxy equivalent of from 0.5 to 0.8 per 100 g. of reaction product and a chlorine content of from 5 to 10 percent by weight.

8. A process for producing paper which comprises adding to an aqueous suspension of cellulosic fibers for making sheet from about 0.01 to about 0.3 percent, with reference to the weight of the dry pulp, of a water-soluble cross-linked reaction product obtained by a. reacting 1 mole of terephthalic acid or a dicarboxylic acid of the formula HOOC—R—COOH, where R is an aliphatic alkylene group having from two to four carbon atoms, with 0.9 to 1.2 moles of an aliphatic amine selected from the group consisting of diethylenetriamine, triethylenetetramine, tetraethylenepentamine, dipropylenetriamine, and tripropylenetetramine, b. thereafter reacting the reaction product of step (a) in an aqueous solution having a solids content of from 30 to 90 percent by weight at a temperature of from 40 to 100° C. with 2 to 20 moles of ethylenimine (I) in the presence of 0.05 to 1 equivalent of an acid (II) selected from the group consisting of sulfuric acid, o- and p-toluenesulfonic acid, phosphoric acid and hydrochloric acid, the molar amount of (I) and (II) being with reference to 1 mole of basic nitrogen in the reaction product of step (a); and thereafter c. reacting the reaction product of step (b) in an aqueous solution having a solids content of from 15 to 30 percent by weight at a temperature of from 40° to 100° C. with 1 to 20 percent by weight, with reference to the solids content, of a bifunctional cross-linking agent selected from the group consisting of epichlorohydrin, methyl acrylate, ethyl acrylate, 1,3-dichloropropanol-2, 1,4-dichlorobutane, the addition product of sodium bisulfite to hexamethylene diisocyanate and the reaction product of pentaerythritol, glycerol and epichlorohydrin, which reaction product has an epoxy equivalent of from 0.5 to 0.8 per 100 g. of reaction product and a chlorine content of from 5 to 10 percent by weight; and cross-linking the reaction product of step (b) to such a degree that a solution containing 25 percent by weight of the said cross-linked product has a viscosity of from 500 to 2,000 centipoises (25° C).

9. A process as claimed in claim 8 wherein the reaction product of step (a) comprises 1 mole of adipic acid and 0.9 to 1.2 moles of diethylenediamine.

10. A process as claimed in claim 8 wherein the reaction product of step (a) further comprises up to 0.4 mole of caprolactam.

11. A process as claimed in claim 8 wherein the reaction product of step (a) further comprises up to 30 percent by weight of the polyalkalenepolyamine of a diamine selected from the group consisting of ethylenediamine, propylenediamine and hexamethylenediamine.

12. A process as claimed in claim 8 wherein the water-soluble cross-linked reaction product is prepared by reacting the reaction product of step (a) in an aqueous solution having a solids content of 50 percent by weight at a temperature of from 40° to 100° C. with 2 to 20 moles of ethylenimine (I) in the presence of from 0.05 to 1.0 equivalent of sulfuric acid or toluenesulfonic acid (II), the amount of (I) and (II) being with reference to one mole of basic nitrogen in the reaction product of step (a); and c. thereafter reacting the reaction product of step (b) in an aqueous solution having a solids content of from 15 to 30 percent by weight with 2 to 10 by weight, with reference to the solids content of the solution, of epichlorohydrin at a temperature of from 40° to 100° C. and cross-linking the reaction product of step (b) to such a degree that a solution containing 25 percent by weight of said cross-linked product has a viscosity of from 500 to 2,000 centipoises (25° C).

13. A process as claimed in claim 8, wherein the reaction product of step (b) is cross-linked with a reaction product of pentaerythritol, glycerol and epichlorohydrin, which reaction product has an epoxy equivalent of from 0.5 to 0.8 per 100 g. of the reaction product and a chlorine content of from 5 to 10 percent by weight.

14. Paper sheet material produced by the process as claimed in claim 8.

15. Paper sheet material produced by the process as claimed in claim 13.

* * * * *

PO-1050
(5/69)

UNITED STATES PATENT OFFICE
CERTIFICATE OF CORRECTION

Patent No. 3,642,572          Dated February 15, 1972

Inventor(s) Horst Endres et al

It is certified that error appears in the above-identified patent and that said Letters Patent are hereby corrected as shown below:

First page, left-hand column, " [22] Filed: Mar. 6, 1969" should read -- [22] Filed: Oct. 6, 1969 --.

First page, right-hand column, fifth line of the abstract, "W-amino-caproic" should read -- $\omega$-amino-caproic --; at the end of the abstract, add -- This reaction product is added to paper pulp in an amount of 0.01 to 0.3 percent by weight of dry pulp as a drainage aid or flocculating agent. --.

Column 2, line 70, "grated-on" should read -- grafted-on --.

Column 5, lines 26 to 30, "6.4   6.5" should read -- 6.4   6.5 --.
                          8.1   6.5                    8.1   6.5
                          8.8   8.1                    8.8   8.1

Column 6, lines 56 to 59, "56   55 " should read -- 56   55 --.
                           41   40                   41   40
                           44   42                   44   42
                           44   43                   44   43

Column 10, lines 43 and 44, "56    " should read --    56    --;
                             44   3$                   44   31 line 75, "2.24.5" should read -- 2.2   4.5 --.

Column 12, line 71, claim 4, "os" should read -- of --.

Column 13, line 5, claim 6, "reaction" should read -- reacted --.

Column 14, line 22, claim 11, "polyalkalenepolyamine" should read -- polyalkylenepolyamine --.

Signed and sealed this 26th day of September 1972.

(SEAL)
Attest:

EDWARD M. FLETCHER, JR.
Attesting Officer

ROBERT GOTTSCHALK
Commissioner of Patents